(12) United States Patent
Ikai et al.

(10) Patent No.: US 12,466,005 B2
(45) Date of Patent: Nov. 11, 2025

(54) SOLID WIRE FOR ARC WELDING USE

(71) Applicant: Kobe Steel, Ltd., Kobe (JP)

(72) Inventors: Kazuya Ikai, Kanagawa (JP); Kazuma Kumagai, Kanagawa (JP); Yasuyuki Yokota, Kanagawa (JP)

(73) Assignee: Kobe Steel, Ltd., Kobe (JP)

( * ) Notice: Subject to any disclaimer, the term of this patent is extended or adjusted under 35 U.S.C. 154(b) by 675 days.

(21) Appl. No.: 17/906,240

(22) PCT Filed: Mar. 10, 2021

(86) PCT No.: PCT/JP2021/009655
§ 371 (c)(1),
(2) Date: Sep. 13, 2022

(87) PCT Pub. No.: WO2021/199998
PCT Pub. Date: Oct. 7, 2021

(65) Prior Publication Data
US 2023/0121467 A1    Apr. 20, 2023

(30) Foreign Application Priority Data

Mar. 31, 2020 (JP) .................... 2020-064919

(51) Int. Cl.
*B23K 35/30* (2006.01)
*B23K 35/02* (2006.01)
*H01B 1/02* (2006.01)

(52) U.S. Cl.
CPC ........ *B23K 35/302* (2013.01); *B23K 35/0272* (2013.01); *B23K 35/3053* (2013.01); *H01B 1/02* (2013.01)

(58) Field of Classification Search
None
See application file for complete search history.

(56) References Cited

U.S. PATENT DOCUMENTS

| | | | |
|---|---|---|---|
| 6,079,243 A | 6/2000 | Inoue et al. | |
| 2003/0085211 A1 | 5/2003 | Ito et al. | |
| 2006/0118537 A1* | 6/2006 | Kim ................. | B23K 35/0261 219/145.1 |

FOREIGN PATENT DOCUMENTS

| | | | |
|---|---|---|---|
| JP | 2000-107881 A | | 4/2000 |
| JP | 2000288768 A | * | 10/2000 |
| JP | 2001287079 A | * | 10/2001 |
| JP | 2006-175452 A | | 7/2006 |
| JP | 2006-315059 A | | 11/2006 |
| JP | 3901600 B2 | | 4/2007 |
| JP | 3933937 B2 | | 6/2007 |
| JP | 2007-290028 A | | 11/2007 |
| JP | 2011-224610 A | | 11/2011 |
| JP | 4916158 B2 | | 4/2012 |

OTHER PUBLICATIONS

Translation of JP-2000288768-A (Year: 2000).*
Translation of JP-2001287079-A (Year: 2001).*
International Search Report issued May 25, 2021, in PCT/JP2021/009655 filed Mar. 10, 2021, 3 pages.

* cited by examiner

*Primary Examiner* — Elizabeth M Kerr
(74) *Attorney, Agent, or Firm* — Oblon, McClelland, Maier & Neustadt, L.L.P.

(57) ABSTRACT

An arc welding solid wire includes: a steel material; and a copper plating layer formed on a surface of the steel material, in which an amount of Cu in the steel material and the copper plating layer is 0.05 mass % to 0.30 mass % with respect to a total mass of the wire, a surface of the wire is coated with 0.05 g to 0.20 g of oil with respect to 1 kg of the wire, and on a surface of the copper plating layer, an arithmetic average roughness Rac in a circumferential direction is 0.25 µm to 1.00 µm, and an arithmetic average roughness Ral in a longitudinal direction is 0.07 µm to 0.50 µm.

7 Claims, No Drawings

SOLID WIRE FOR ARC WELDING USE

TECHNICAL FIELD

The present invention relates to an arc welding solid wire.

BACKGROUND ART

Gas shielded arc welding using carbon dioxide is a most widely used welding method because of high welding efficiency and low cost. In particular, in the field of steel frame building, a thickness and a strength of steel materials are increasing due to an increase in a size and a height of buildings, and a demand for construction efficiency continues to grow.

In view of an increase in a demand for construction and a decrease in welders, automatic welding using a robot and the like is becoming more widespread, and there is an increasing need for a welding wire whose arc stability is not impaired by wear of a power supply tip even if welding has been continuously performed for a long time.

As a welding method for reducing spatter that reduces the construction efficiency, applications of pulsed arc welding, which stabilizes droplet transfer by combining a high pulse current and a low pulse current, and "wire feeding control arc welding method" that controls the droplet transfer by synchronizing wire feeding and current and voltage waveforms during arc welding are rapidly expanding. The wire feeding control arc welding method realizes stable and continuous short circuit transfer, and reduces the spatter by reverse-feeding a welding wire at the moment of a short circuit.

In recent years, in development of the wire feeding control arc welding method, establishment of a spatter reduction technique in a high current region is being actively promoted in order to achieve both reduction of the spatter and a high speed of welding. Therefore, a load on a power supply tip becomes higher and higher due to a high current and a high speed of forward and reverse feeding of a wire, and the arc stability decreases when welding is continuously performed for a long time, and thus a frequency of replacing the power supply tip is higher than that of constant voltage welding in the related art.

In the first place, in the arc welding using carbon dioxide, droplets grow due to a push-up effect of an arc by an electromagnetic pinch force and are difficult to detach, and as a result, the spatter due to a short circuit or detachment of enlarged droplets tends to increase. Here, removal of the spatter adhering to a weld portion, or cleaning or replacing work on a shield nozzle or the power supply tip affects on deterioration of the construction efficiency.

Patent Literature 1 discloses that by using a welding wire containing a surface lubricant containing appropriate amounts of molybdenum disulfide and phospholipid on a surface of the wire, feedability of the wire is stable even if the welding has been continuously performed for a long time.

Patent Literature 2 and Patent Literature 3 disclose that by containing the above surface lubricating oil and molybdenum disulfide on a surface where dents are present, the feedability is excellent and an arc is stable. Patent Literature 4 discloses a technique for a copper plated arc welding wire with a dent formed. Such a technique makes a sliding contact in a power supply tip stable, and does not take into account instability of the arc due to physical clogging in a wire feeding system or a damage to the power supply tip, which is a problem in continuous welding for a long time.

CITATION LIST

Patent Literature

Patent Literature 1: JP-A-2006-175452
Patent Literature 2: Japanese Patent No. 3901600
Patent Literature 3: Japanese Patent No. 3933937
Patent Literature 4: JP-A-2006-315059

SUMMARY OF INVENTION

Technical Problem

However, the technique disclosed in Patent Literature 1 may not sufficiently exert an effect in a long feeding system or during continuous welding for a long time because the surface lubricant is separated in the middle. If the continuous welding is performed without a cleaning work on the separated surface lubricant, feeding may be physically hindered and adversely affected. A used gas is limited to an Ar—$CO_2$ mixed gas, and is difficult to be used for carbon dioxide arc welding.

The techniques disclosed in Patent Literatures 2 and 3 are limited to arc welding wires without copper plating. In recent years, in continuous welding for a long time whose need is increasing, when an arc welding wire without copper plating is used, an arc becomes stable due to an increase in an electrical contact resistance at a power supply tip, but an amount of heat generated at a distal end of the power supply tip, which is a contact, is large, and a copper component of the molten power supply tip is welded to the wire, so that the tip is severely damaged.

The technique disclosed in Patent Literature 4 makes the sliding contact in the power supply tip stable, and does not take into account instability of the arc due to the physical clogging in the wire feeding system or the damage to the power supply tip, which is the problem in the continuous welding for a long time.

The present invention has been made in view of the above circumstances, and an object of the present invention is to provide an arc welding solid wire having excellent arc stability even if continuous welding has been performed for a long time.

Solution to Problem

An arc welding solid wire according to the present invention is an arc welding solid wire including a steel material and a copper plating layer formed on a surface of the steel material, in which an amount of Cu in the steel material and the copper plating layer is 0.05 mass % to 0.30 mass % with respect to a total mass of the wire, a surface of the wire is coated with 0.05 g to 0.20 g of oil with respect to 1 kg of the wire, and on a surface of the copper plating layer, an arithmetic average roughness Rac in a circumferential direction is 0.25 μm to 1.00 μm, and an arithmetic average roughness Ral in a longitudinal direction is 0.07 μm to 0.50 μm.

In an arc welding solid wire according to a preferred embodiment of the present invention, an amount of Cu powder adhering to the surface of the wire is 0.03 g or less with respect to 1 kg of the wire.

In the arc welding solid wire according to the preferred embodiment of the present invention, the oil contains at least one selected from a vegetable oil, a mineral oil, an animal oil, and a synthetic oil, and an amount of sulfide in the oil is 0.01 g to 0.03 g with respect to 1 kg of the wire.

In the arc welding solid wire according to the preferred embodiment of the present invention, a total amount of solid matters present on the surface of the wire is 0.04 g or less with respect to 1 kg of the wire.

Advantageous Effects of Invention

The present invention can provide an arc welding solid wire whose arc stability is excellent even if welding has been continuously performed for a long time in arc welding using an arc welding wire formed with copper plated.

DESCRIPTION OF EMBODIMENTS

An embodiment of the present invention will be described in detail below. It should be noted that the present invention is not limited to the embodiment described below, and can be optionally changed without departing from the gist of the present invention.

The present inventors conclude that in arc welding using a solid wire formed with a copper plating layer, as a result of diligent studies to obtain the solid wire with excellent arc stability even if the welding has been continuously performed for a long time, it is necessary to maintain the arc stability by preventing wear of a power supply tip. Specifically, it is considered to be effective to retain a required lubricant up to the power supply tip by appropriately managing irregularities on a surface of a welding wire.

Accordingly, an arc welding solid wire according to the present embodiment is an arc welding solid wire including a steel material and a copper plating layer formed on a surface of the steel material, in which an amount of Cu in the steel material and the copper plating layer is 0.05 mass % to 0.30 mass % with respect to a total mass of the wire, a surface of the wire is coated with 0.05 g to 0.20 g of oil with respect to 1 kg of the wire, and on a surface of the copper plating layer, an arithmetic average roughness Rac in a circumferential direction is 0.25 µm to 1.00 µm, and an arithmetic average roughness Ral in a longitudinal direction is 0.07 µm to 0.50 µm.

Hereinafter, each item defining the arc welding solid wire according to the present embodiment and means for carrying out the same will be described in detail.

<Amount of Cu in Steel Material and Copper Plating Layer: 0.05 Mass % to 0.30 Mass % with Respect to Total Mass of Wire>

The copper plating layer is formed on the surface of the steel material for an object of improving electrical conductivity between the power supply tip and the welding wire. If the amount of Cu in the steel material and the copper plating layer is less than 0.05 mass % with respect to the total mass of the wire, an electrical contact resistance between the power supply tip and the welding wire increases, so that the power supply tip is significantly worn and an arc becomes unstable. Therefore, the amount of Cu in the steel material and the copper plating layer is 0.05 mass % or more, preferably 0.10 mass % or more, and more preferably 0.20 mass % or more with respect to the total mass of the wire.

Meanwhile, if the amount of Cu in the steel material and the copper plating layer is more than 0.30 mass % with respect to the total mass of the wire, the copper plating layer on the surface of the welding wire is likely to be peeled off in a case of coming into contact with a wire feeding system used for welding. As a result, the peeled copper plating remains inside the wire feeding system, which may impair feedability of the wire. Therefore, the amount of Cu in the steel material and the copper plating layer is 0.30 mass % or less, preferably 0.27 mass % or less, and more preferably 0.25 mass % or less with respect to the total mass of the wire.

The amount of Cu includes not only Cu contained in the copper plating layer but also Cu in the steel material used as a core material of the welding wire. Therefore, the above amount of Cu can be adjusted by an amount of the copper plating formed on the surface of the steel material and an amount of the Cu component contained in the steel material.

<Amount of Oil Applied on Surface of Wire: 0.05 g to 0.20 g with Respect to 1 kg of Wire>

The oil applied on the surface of the wire serves as a lubricant to ensure slipperiness of the welding wire in a feeding path. If the oil plays the above role, a type of the oil is not limited, and examples thereof include liquid oils such as vegetable oils, mineral oils, animal oils, and synthetic oils. These oils may be used alone or in combination as long as the above object is achieved.

By dispersing a solid lubricant such as sulfide in the above oil and then applying the solid lubricant to the welding wire, the lubricant can be uniformly applied to the surface of the wire. However, an excessive amount of the solid lubricant may affect clogging of the feeding system and should be limited to, for example, 0.15 g or less with respect to 1 kg of the wire.

A method of applying the oil to the surface of the wire is not particularly limited and can be carried out by a well-known method of applying.

If the amount of oil applied to the surface of the wire is less than 0.05 g with respect to 1 kg of the wire, since the amount of oil needed to act as a lubricant is insufficient, wire feeding is unstable, and the arc stability may be significantly impaired. Therefore, the amount of oil applied to the surface of the wire is 0.05 g or more, preferably 0.06 g or more, and more preferably 0.07 g or more with respect to 1 kg of the wire.

Meanwhile, if the amount of oil applied to the surface of the wire is more than 0.20 g with respect to 1 kg of the wire, an excessive oil film may be formed, and power supply between the power supply tip and the welding wire may be hindered. If the welding has been continuously performed for a long time, the oil may remain inside the feeding system and impair the arc stability. Therefore, the amount of oil applied to the surface of the wire is 0.20 g or less, preferably 0.15 g or less, and more preferably 0.10 g or less with respect to 1 kg of the wire.

<On Surface of Copper Plating Layer, Arithmetic Average Roughness Rac in Circumferential Direction: 0.25 µm to 1.00 µm, and Arithmetic Average Roughness Ral in Longitudinal Direction: 0.07 µm to 0.50 µm>

Irregularities on the surface of the copper plating layer serve to retain a lubricating oil and the solid lubricant. By stabilizing a contact between the power supply tip and the welding wire, the arc is stabilized.

For the arc stability in the continuous welding for a long time, stable melting with the power supply tip and preventing excessive wear of the power supply tip are effective. By providing predetermined irregularities on the surface of the copper plating layer, the surface of the wire is stably melted, and a damage to the power supply tip is reduced. The lubricating oil and the solid lubricant trapped in the irregularities not only ensure the feedability of the wire, but also promote stable melting with the power supply tip.

If the arithmetic average roughness Rac in the circumferential direction on the surface of the copper plating layer is less than 0.25 µm, the feeding lubricant is not applied uniformly, so that the wire feeding is not stable and the arc becomes unstable. The lubricant applied to the surface of the wire is likely to be peeled off in the feeding path, the electrical conductivity at a distal end of the power supply tip decreases, and the arc becomes unstable. Therefore, the arithmetic average roughness Rac in the circumferential direction is 0.25 µm or more, preferably 0.30 µm or more, and more preferably 0.35 µm or more.

Meanwhile, if the arithmetic average roughness Rac in the circumferential direction on the surface of the copper plating layer is more than 1.00 µm, an exposed part of an iron base increases in the copper plating layer, so that the electrical contact resistance between the power supply tip and the welding wire increases, and the power supply tip wears. Therefore, the arithmetic average roughness Rac in the circumferential direction is 1.00 µm or less, preferably 0.50 µm or less, and more preferably 0.45 µm or less.

If the arithmetic average roughness Ral in the longitudinal direction on the surface of the copper plating layer is less than 0.07 µm, the feeding lubricant is not applied uniformly, so that the wire feeding is not stable and the arc becomes unstable. The lubricant applied to the surface of the wire is likely to be peeled off in the feeding path, the electrical conductivity at the distal end of the power supply tip decreases, and the arc becomes unstable. Therefore, the arithmetic average roughness Ral in the longitudinal direction is 0.07 µm or more, preferably 0.10 µm or more, and more preferably 0.15 µm or more.

Meanwhile, if the arithmetic average roughness Ral in the longitudinal direction on the surface of the copper plating layer is more than 0.50 µm, partial exposure of an iron base increases, and thus variation in a resistance during the power supply increases, and the arc becomes unstable. Therefore, the arithmetic average roughness Ral in the longitudinal direction is 0.50 µm or less, preferably 0.40 µm or less, and more preferably 0.35 µm or less.

In order to adjust the arithmetic average roughness Rac in the circumferential direction and the arithmetic average roughness Ral in the longitudinal direction on the surface of the copper plating layer within the above numerical ranges, it is preferable to provide a step of mechanically or chemically applying strong processing to the surface of the welding wire before performing a copper plating process on the steel material or after performing the copper plating process. Here, the strong processing means processing that combines machine working such as shot blasting polishing and sandpaper polishing, chemical working such as immersion in hydrochloric acid, and wire drawing process of hole dies or roller dies.

A welding wire manufacturing step appropriately combines rolling, annealing, pickling, copper plating, and a wire drawing process. Intentional provision of irregularities by the machine working can be implemented, for example, by applying shot peening before performing the copper plating process on the steel material. A steel round cut wire is projected onto a surface of a 5.5φ steel wire. Hardness of a shot material is harder than that of the steel wire. It can be achieved that with respect to a 5.5φ YGW12 raw wire, it is preferable to use a shot material having hardness of 300 HV to 400 HV and a particle size of about 0.3 mm to 0.8 mm, and a surface coverage is set to 98% or more.

There is also a method of forming the irregularities by shot blasting the wire after the copper plating. In that case, if a projection energy is too strong, the plating will peel off, and thus it is preferable to use a blast material having a small particle size. For example, with respect to a 2.4φ YGW 12 copper plating wire, it is preferable to use a blast material made of steel, ceramics or resin having a particle size of about 30 µm to 200 µm, and a surface coverage is 98% or more.

Provision of the irregularities by machine working other than the shot peening can be implemented by polishing the surface of the steel wire with sandpaper before performing the copper plating process on the steel material. #80 to #240 sandpaper is applied to and polishes the surface of the 5.5φ steel wire. The irregularities can be intentionally formed by using a general material, in which ceramics such as SiC and $Al_2O_3$ are solidified with an adhesive, as an abrasive cloth.

Next, intentional provision of the irregularities by annealing and pickling can be implemented by forming scale when the 5.5φ steel wire is annealed and the scale is removed by pickling. The 5.5φ steel wire is annealed at 700° C. to 800° C., and then the surface of the wire is pickled with a hydrochloric acid. As a result of removing the scale from the surface and a brain boundary oxidation part by pickling, the irregularities can be intentionally formed.

When the surface of the wire is formed with the irregularities by the above method and drawn to a product diameter, by drawing with a micromill or a roller die rather than a hole die, the diameter can be reduced while maintaining an intentionally formed arithmetic average roughness, and the arithmetic average roughness Rac in the circumferential direction and the arithmetic average roughness Ral in the longitudinal direction can be set within the above-described predetermined ranges in the product diameter.

The surface work of the welding wire is performed before and after the formation of the copper plating layer, and it is effective to perform the above work at a timing when a wire diameter of the welding wire is large in view of histories of the machine working and the wire drawing process. That is, rather than forming the copper plating layer after drawing the welding wire to the product diameter, it is important to perform the machine working and then draw the wire to the product diameter before or after forming the copper plating layer in a state of a large diameter (wire strand diameter).

The irregularities on the surface of the welding wire that has been subjected to the strong processing need to be present not only in the circumferential direction of the welding wire (circumferential direction if the welding wire is cylindrical) but also in the longitudinal direction of the welding wire. By having the irregularities with a predetermined arithmetic average roughness not only in the circumferential direction but also in the longitudinal direction, an effect of trapping the lubricating oil and the solid lubricant can be expected to be improved.

In order to maintain better arc stability or improve the feedability of the wire in the continuous welding for a long time, it is preferable to satisfy each of the following items.

<Amount of Cu Powder Adhering to Surface of Wire: 0.03 g or Less with Respect to 1 kg of Wire>

As described above, the strong processing is performed on the surface of the welding wire after the copper plating process is performed on the steel material, but the copper plating layer has a low strength, and thus the processing is performed under control of an appropriate manufacturing condition so as not to cause a severe surface reduction rate during the wire drawing process, for example. If the control is not appropriate, a large amount of Cu powder generated by the process may remain on the surface of the welding wire. By reducing the amount of Cu powder to a predetermined amount or less, the feedability of the welding wire and the electrical conductivity with the power supply tip can be made excellent even if the welding has been continuously performed for a long time.

Therefore, the less the amount of Cu powder adhering to the surface of the copper plating layer, the more preferable, and an upper limit is 0.03 g with respect to 1 kg of the wire. The adhering amount of Cu powder is preferably 0.02 g or less, and more preferably 0.01 g or less.

In order to reduce the amount of Cu powder adhering to the wire surface to 0.03 g or less with respect to 1 kg of the wire, as described above, an appropriate manufacturing condition may be set so as not to cause a severe surface reduction rate during the wire drawing process. However, another method is also useful to intentionally remove the Cu powder generated during the wire drawing process in subsequent manufacturing steps. Specifically, it is considered to provide a step of wiping the surface of the welding wire after the wire drawing process and a step of cleaning the surface of the welding wire.

<Amount of Sulfide in Oil: 0.01 g to 0.03 g with Respect to 1 kg of Wire>

The amount of sulfide in the oil further enhances the effect as a lubricant, so that the feedability of the welding wire is improved. By actively melting the surface of the wire, a damage to the power supply tip is reduced and the arc stability is maintained even in the continuous welding for a long time.

When the amount of sulfide in the oil is 0.01 g or more with respect to 1 kg of the wire, the above effect can be sufficiently obtained. Therefore, the amount of sulfide in the oil is 0.01 g or more, preferably 0.015 g or more, and more preferably 0.020 g or more with respect to 1 kg of the wire.

Meanwhile, when the amount of sulfide in the oil is 0.03 g or less with respect to 1 kg of the wire, the above effect is saturated, and the feeding of the welding wire can be prevented from being hindered. Therefore, the amount of sulfide in the oil is 0.03 g or less, preferably 0.025 g or less, and more preferably 0.020 g or less with respect to 1 kg of the wire.

Specific examples of the above sulfide include molybdenum disulfide and zinc sulfide.

<Total Amount of Solid Matters Present on Surface of Wire: 0.04 g or Less with Respect to 1 kg of Wire>

The solid matters present on the surface of the copper plating layer include copper powder obtained by falling-off copper plating or reattached in the manufacturing step. In addition, a lubricant or the like at the time of wire drawing is included.

When the total amount of solid matters present on the surface of the wire is 0.04 g or less with respect to 1 kg of the wire, the amount of solid matters remaining in the feeding system after long-term welding can be suppressed and weldability can be improved. Therefore, the total amount of solid matters present on the surface of the wire is 0.04 g or less, preferably 0.03 g or less, and more preferably 0.01 g or less.

Specifically, the solid matters include, for example, the copper powder, a calcium or sodium-based soap, and the like.

<Chemical Composition of Steel Material>

Composition of the steel material that is a core material of the arc welding solid wire according to the present embodiment is not particularly limited, and for example, with respect to the total mass of the wire, contains C: 0.02 mass % to 0.08 mass %, Si: 0.01 mass % to 1.00 mass %, Mn: 0.30 mass % to 2.20 mass %, Ti: 0.001 mass % to 0.30 mass %, Cu: 0.05 mass % to 0.30 mass %, P: 0.025 mass % or less (including 0 mass %), and S: 0.025 mass % or less (including 0 mass %), and a remainder contains Fe and an unavoidable impurity. One or more of Cr, Al, and Mo may be contained in a range of 0.50 mass % or less, and N and O may be contained in a range of 0.010 mass % or less, respectively. A range of the chemical composition is determined by mechanical properties of a required weld metal part, a bead shape at the time of welding, slag removability, and the like.

EXAMPLES

Hereinafter, the present invention will be described in more detail with reference to Examples. However, the present invention is not limited to these Examples, and can be implemented with modifications within the scope that can be adapted to the gist of the invention, and all of them are included in the technical scope of the present invention.

<Manufacture of Wire>

First, a molten ingot was rolled to 5.50 by hot working, and then annealed in a temperature range of 700° C. to 800° C. Then, by pickling with hydrochloric acid, an oxide on the surface of the wire was chemically removed to control the irregularities. Thereafter, copper plating with a thickness that does not erase the irregularities is applied to the surface, and then a wire diameter was reduced to 1.2 mm by a roller die or a hole die with cold wire drawing, and the oil (type: mineral oil) was applied to the surface to obtain a welding wire (composition: YGW12, YGW18).

As necessary, steps such as hot water washing and cloth wiping were added for an object of removing a foreign matter adhering to the surface of the wire after wire drawing process. Further, for an object of improving lubricity, not only the oil but also the sulfide (type: molybdenum disulfide) was applied.

In this way, each solid wire was prepared in which the "amount of Cu in the steel material and copper plating layer with respect to the total mass of the wire", the "amount of oil applied to the surface of the wire with respect to 1 kg of the wire", the "arithmetic average roughness Rac in the circumferential direction on the surface of the copper plating layer", the "arithmetic average roughness Ral in the longitudinal direction on the surface of the copper plating layer", the "amount of Cu powder adhering on the surface of the wire with respect to 1 kg of the wire", the "amount of sulfide in the oil with respect to 1 kg of the wire", and the "total amount of solid matters present on the surface of the wire with respect to 1 kg of the wire" satisfied conditions as shown in Table 3.

<Gas Shielded Arc Welding>

Tables 1 and 2 show welding conditions for gas shielded arc welding using wires of Examples of the present invention and Comparative Examples. A plate-shaped steel sheet with a length and width of 650 mm and a thickness of 25 mm is arranged horizontally by automatic welding using a robot, a gas shielded arc welding wire manufactured by the above method was used, and the welding (bead on plate) was continuously performed on a flat plate under welding conditions shown in Table 1 or Table 2.

Before the start of welding, an unused welding tip for a wire diameter of 1.2 mm was attached. Thereafter, the welding was started from an end of the steel sheet, and after welding 650 mm, a welding position was shifted such that weld beads did not overlap, and then the welding was continued in an opposite direction.

TABLE 1

| Welding conditions | |
|---|---|
| Welding wire | Equivalent to YGW18 in accordance with JIS Z 3312:2009 |
| Welding current | 330 A |
| Travel speed | 30 cpm |
| Shielding gas | 100% $CO_2$ |
| Gas flowing amount | 20 L/min |
| Contact-tip to work distance | 25 mm |
| Push and drag angles | 0° |
| Welding mode | Constant voltage |

TABLE 2

| Welding conditions | |
|---|---|
| Welding wire | Equivalent to YGW12 in accordance with JIS Z 3312:2009 |
| Welding current | 200 A |
| Travel speed | 30 cpm |
| Shielding gas | 100% $CO_2$ |
| Gas flowing amount | 20 L/min |
| Contact-tip to work distance | 20 mm |
| Push and drag angles | 0° |
| Welding mode | Wire feeding control (synchronization of wire forward or reverse feeding and current and voltage waveforms) |

<Evaluation of Wire>

In an evaluation of the weldability of the welding wire, the arc stability after continuous welding for 1 hour was evaluated. If tip wear progresses after 1 hour of the welding, a feeding point on the welding tip varies and the arc becomes unstable. After 1 hour of the continuous welding, if the arc becomes unstable, the evaluation is determined as "x" (defective), if the arc was stable, the evaluation is determined as "B" (good), and if the arc was stable and no deposit was confirmed at a base of the welding tip, the evaluation is determined as "A" (excellent). Evaluation results of the arc stability are also shown in Table 3 below.

TABLE 3

| | | Specifications of wire | | | | | | | |
|---|---|---|---|---|---|---|---|---|---|
| | | | | Arithmetic average roughness [μm] | | Adhering amount of | | Total amount of | |
| Section | Wire No. | Amount of Cu [wt %] | Amount of oil [g/kg] | Circumferential direction Rac | Longitudinal direction Ral | Cu powder [g/kg] | Amount of sulfide in oil [g/kg] | solid matters [g/kg] | Welding condition | Evaluation Arc stability |
| Example | 1 | 0.23 | 0.09 | 0.66 | 0.10 | 0.02 | 0.01 | 0.03 | Described in Table 1 | A |
| | 2 | 0.23 | 0.07 | 0.27 | 0.12 | 0.01 | <0.01 | 0.02 | | B |
| | 3 | 0.18 | 0.08 | 0.32 | 0.09 | 0.01 | 0.01 | 0.02 | | A |
| | 4 | 0.19 | 0.09 | 0.27 | 0.08 | 0.01 | 0.01 | 0.02 | | A |
| | 5 | 0.24 | 0.07 | 0.43 | 0.14 | 0.02 | 0.02 | 0.05 | | B |
| | 6 | 0.24 | 0.13 | 0.47 | 0.21 | 0.01 | 0.01 | 0.03 | Described in Table 2 | A |
| | 7 | 0.25 | 0.08 | 0.42 | 0.11 | 0.00 | 0.01 | 0.01 | | A |
| | 8 | 0.26 | 0.11 | 0.47 | 0.20 | 0.01 | 0.01 | 0.03 | | A |
| Comparative Example | 9 | 0.25 | 0.10 | 0.37 | 0.04 | 0.04 | 0.01 | 0.06 | Described in Table 1 | x |
| | 10 | 0.22 | 0.08 | 0.34 | 0.03 | 0.01 | <0.01 | 0.02 | | x |
| | 11 | 0.19 | 0.04 | 0.24 | 0.02 | — | 0.01 | 0.04 | | x |
| | 12 | 0.21 | 0.04 | 0.22 | 0.05 | — | 0.01 | 0.03 | | x |
| | 13 | 0.03 | 0.14 | 0.45 | 0.08 | — | <0.01 | 0.04 | Described in Table 2 | x |
| | 14 | 0.25 | 0.09 | 0.45 | 0.03 | 0.02 | <0.01 | 0.03 | | x |

In Table 3, "-" of the adhering amount of Cu powder indicates that measurement has not been performed. "<0.01" of the amount of sulfide in the oil indicates that the amount of sulfide is less than 0.01 g/kg.

As shown in Table 3 above, in wire Nos. 1 to 8, which are Examples, all of the "amount of Cu in the steel material and copper plating layer with respect to the total mass of the wire", the "amount of oil applied to the surface of the wire with respect to 1 kg of the wire", the "arithmetic average roughness Rac in the circumferential direction on the surface of the copper plating layer", and the "arithmetic average roughness Ral in the longitudinal direction on the surface of the copper plating layer" satisfy the conditions of the present invention, and thus the evaluation results were A or B, and the arc stability was excellent.

In particular, in the wire Nos. 1, 3, 4, and 6 to 8, the "amount of sulfide in the oil with respect to 1 kg of the wire" and the "total amount of solid matters present on the surface of the wire with respect to 1 kg of the wire" satisfy the preferable conditions of the present invention, and thus the evaluation results were A, and the arc stability was particularly excellent.

Meanwhile, in wire Nos. 9 to 14, which are Comparative Examples, at least one of the "amount of Cu in the steel material and copper plating layer with respect to the total mass of the wire", the "amount of oil applied to the surface of the wire with respect to 1 kg of the wire", the "arithmetic average roughness Rac in the circumferential direction on the surface of the copper plating layer", and the "arithmetic average roughness Ral in the longitudinal direction on the surface of the copper plating layer" does not satisfy the conditions of the present invention, and thus the arc stability was inferior.

Specifically, in the wire Nos. 9, 10, and 14, the "arithmetic average roughness Ral in the longitudinal direction on the surface of the copper plating layer" does not satisfy the condition of the present invention, and thus the evaluation results were x, and the arc stability was inferior.

In the wire Nos. 11 and 12, the "amount of oil applied to the surface of the wire with respect to 1 kg of the wire", the "arithmetic average roughness Rac in the circumferential direction on the surface of the copper plating layer", and the "arithmetic average roughness Ral in the longitudinal direction on the surface of the copper plating layer" does not satisfy the conditions of the present invention, and thus the arc stability was inferior.

In the wire No. 13, the "amount of Cu in the steel material and copper plating layer with respect to the total mass of the wire" does not satisfy the condition of the present invention, and thus the evaluation result was x, and the arc stability was inferior.

As described above, it was shown that the arc welding solid wire according to the present invention is excellent in the arc stability even if the welding has been continuously performed for a long time.

Although various embodiments have been described above, it is needless to say that the present invention is not limited to these examples. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the gist of the present invention.

The present application is based on a Japanese patent application (No. 2020-064919) filed on Mar. 31, 2020, contents of which are incorporated by reference in the present application.

The invention claimed is:

1. An arc welding solid wire comprising:
    a steel material; and
    a copper plating layer formed on a surface of the steel material,
    wherein an amount of Cu in the steel material and the copper plating layer is 0.05 mass % to 0.30 mass % with respect to a total mass of the wire,
    a surface of the wire is coated with 0.05 g to 0.20 g of oil with respect to 1 kg of the wire, and
    on a surface of the copper plating layer, an arithmetic average roughness Rac in a circumferential direction is 0.25 μm to 1.00 μm, and an arithmetic average roughness Ral in a longitudinal direction is 0.07 μm to 0.50 μm.

2. The arc welding solid wire according to claim 1, wherein an amount of Cu powder adhering to the surface of the wire is 0.03 g or less with respect to 1 kg of the wire.

3. The arc welding solid wire according to claim 2, wherein the oil contains at least one selected from a vegetable oil, a mineral oil, an animal oil, and a synthetic oil, and an amount of sulfide in the oil is 0.01 g to 0.03 g with respect to 1 kg of the wire.

4. The arc welding solid wire according to claim 2, wherein a total amount of solid matters present on the surface of the wire is 0.04 g or less with respect to 1 kg of the wire.

5. The arc welding solid wire according to claim 1, wherein the oil contains at least one selected from a vegetable oil, a mineral oil, an animal oil, and a synthetic oil, and an amount of sulfide in the oil is 0.01 g to 0.03 g with respect to 1 kg of the wire.

6. The arc welding solid wire according to claim 5, wherein a total amount of solid matters present on the surface of the wire is 0.04 g or less with respect to 1 kg of the wire.

7. The arc welding solid wire according to claim 1, wherein a total amount of solid matters present on the surface of the wire is 0.04 g or less with respect to 1 kg of the wire.

* * * * *